United States Patent [19]

Tatematsu

[11] Patent Number: 4,724,576
[45] Date of Patent: Feb. 16, 1988

[54] HANDLE OF A POT

[75] Inventor: Shunji Tatematsu, Kyoto, Japan

[73] Assignee: Nitto Aluminium Mfg. Co., Ltd., Amagasaki, Japan

[21] Appl. No.: 919,679

[22] Filed: Oct. 16, 1986

[30] Foreign Application Priority Data

May 27, 1986 [JP] Japan .............................. 61-81707[U]

[51] Int. Cl.⁴ ........................ A47J 45/06; E05D 11/10
[52] U.S. Cl. .................................. 16/110 A; 16/112; 16/324; 16/331; 403/325
[58] Field of Search ................. 16/110 A, 114 R, 112, 16/114 A, 324, 326, 328, 332, 349, 353, 378, 380, 374, 331, DIG. 24, DIG. 41; 403/93, 94, 97, 325

[56] References Cited

U.S. PATENT DOCUMENTS 4,645,905 2/1987 Ming ...................................... 16/328

FOREIGN PATENT DOCUMENTS 1163172 9/1958 France ................................. 16/332
1018079 1/1966 United Kingdom ................. 16/326

Primary Examiner—Nicholas P. Godici
Assistant Examiner—Edward Brown
Attorney, Agent, or Firm—Wenderoth, Lind & Ponack

[57] ABSTRACT

An improved handle of a pot is proposed which can be turned to its inoperative position over the pot to occupy less space during storage or transit. In use, the handle is locked in its operative position. It has a handle body and a metal fitting secured to the pot. The handle body has a tubular portion extending downwardly and the metal fitting has a tubular portion extending upwardly to receive the tubular portion of the handle body so that the handle body can be turned with respect to the metal fitting and thus to the pot within a limited angle.

1 Claim, 9 Drawing Figures

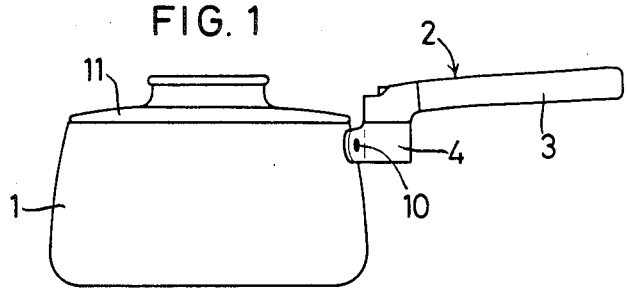
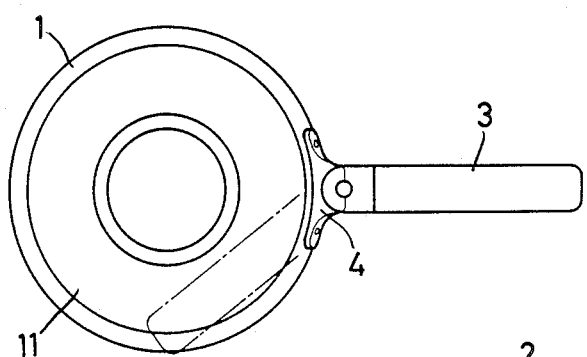
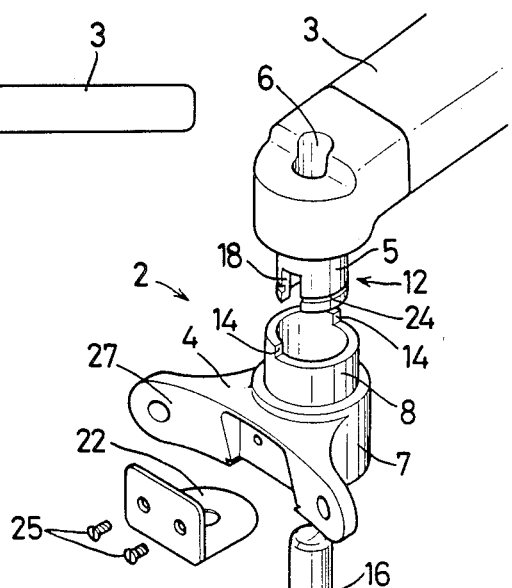
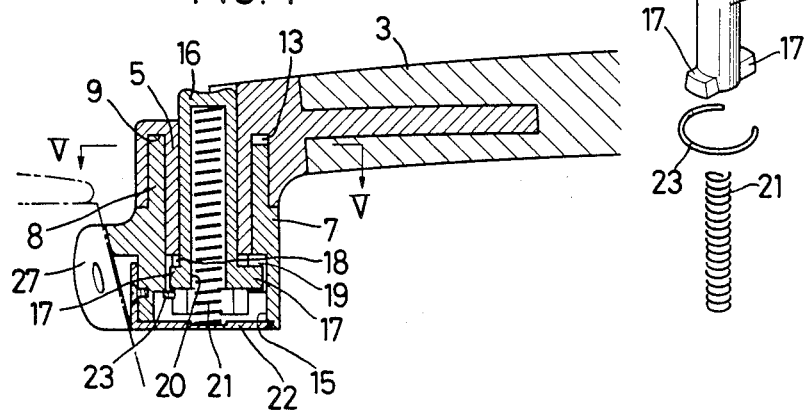

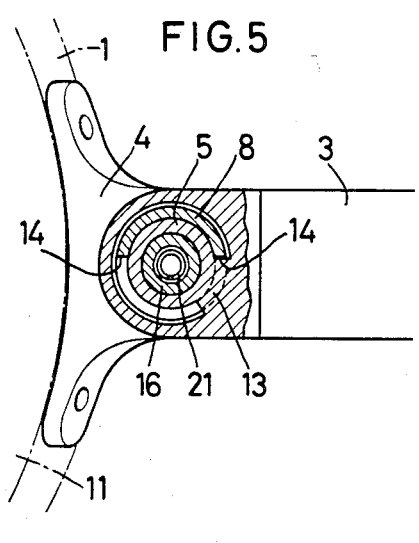
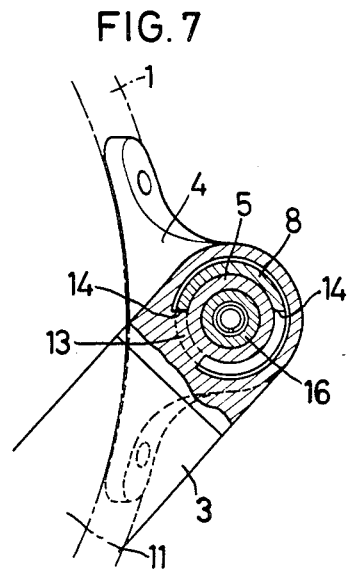
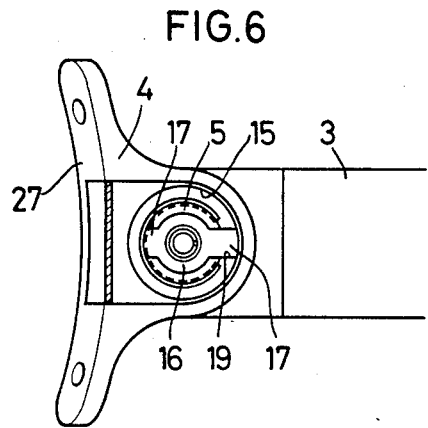
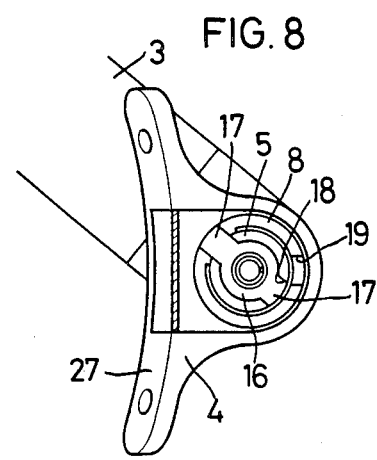
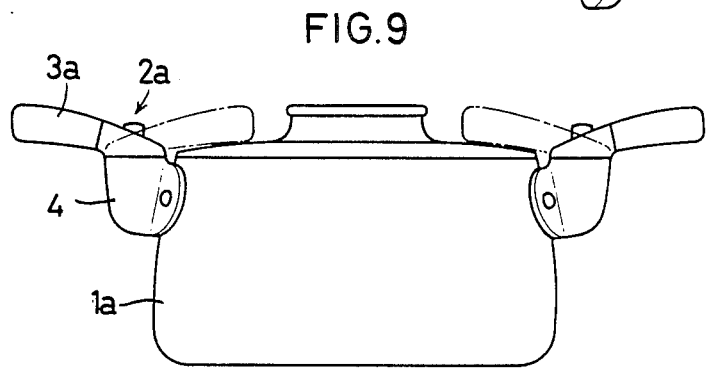

HANDLE OF A POT

The present invention relates to the handle of a pot.

A pot is adapted to be held either with a single hand or with both hands. Although the handle of a small pan is usually riveted to the pan, most of the pots in recent times have handles fastened with bolts so that these handles can be detached from the pots so as to take less space during transportation.

The trouble with such pots which have handles fastened with bolts is that after using these pots, one finds it difficult to arrange them neatly on a shelf because they occupy more space.

It is an object of the present invention to provide a handle of a pot which is not a hindrance to a neat arrangement on a shelf.

In accordance with the present invention, there is provided a handle of a pot comprising a handle body and a metal fitting secured to the pot for mounting the handle body to the pot, the handle body having a barrel-shaped portion projecting downwardly from one end thereof, the metal fitting having a barrel-shaped portion projecting upwardly and adapted to receive therein the barrel-shaped portion of the handle body, an arbor mounted in the barrel-shaped portion of the handle body and having a pair of projections formed on the lower end thereof, the arbor being formed with a blind hole which is closed at its top and open at its bottom, a spring means mounted in the blind hole to urge the arbor upwardly, a base plate covering the lower end of the barrel-shaped portion of the metal fitting and the lower end of the blind hole to support one end of the spring means, the top end of the arbor projecting from the top face of the handle body with one of the projections engaged in a notch formed in the lower end of the barrel-shaped portion of the handle body and the other of the projections engaged in an indentation formed in the metal fitting at lower end thereof, the barrel-shaped portion of the handle body being received in the barrel-shaped portion of the metal fitting so that the handle body can be rotated to an inoperative position over the pot for a limited angle.

The metal fitting is secured to the pot by means of rivets. The upper end of the arbor normally projects from the top face of one end of the handle, the projecting portion having such a length that when the arbor is pushed down, one of the two projections formed at diametrically opposite positions on the lower end of the arbor remains in engagement with a notch cut out in the lower end of the inner barrel, while the other is disengaged from the indentation provided in the recess in the under surface of the hub-shaped portion with the result that the body of the handle is unlocked and can be rotated to a position where the body is placed over the pot lid. When the body is rotated reversely from the above-mentioned position to its operative position, the means for limiting the rotation of the body prevents the body from further rotation than a prescribed position, where the body is locked because the coil spring accommodated in the blind hole axially provided in the arbor allows the second one of the two projections to come again into engagement with the indentation provided in the recess in the under surface of the hub-shaped portion.

With the above-described object in view and as will become apparent from the following detailed description, the present invention will be more clearly understood in connection with the accompanying drawings.

FIG. 1 is a front view of a pot provided with a handle embodying the present invention;

FIG. 2 is a plan view thereof;

FIG. 3 is an exploded perspective view of the handle;

FIG. 4 is a vertical sectional front view thereof in an assembled state in use;

FIG. 5 is a sectional plan view taken along line V—V of FIG. 4;

FIG. 6 is a partially cutaway bottom view of the portion corresponding to that shown in FIG. 5;

FIG. 7 is a partially cutaway plan view thereof, illustrating the parts when the body of the handle is placed over the pot lid;

FIG. 8 is a partially cutaway bottom view of the portion corresponding to that shown in FIG. 7; and FIG. 9 is a front view of a pot provided with another embodiment of the present invention;

Referring now to FIGS. 1 and 2, a pot 1 is provided with a single handle 2, which comprises a handle body 3 and a metal fitting 4.

As shown in FIGS. 3 and 4, a barrel-shaped portion 5 projects downwardly from one end of the handle body 3. A hole 6 axially extends through the barrel-shaped portion 5 and is open in the top face of the end of the body 3.

The metal fitting 4 has a hub-shaped portion 7 (FIGS. 3 and 4), on which a barrel-shaped portion 8 projects upwardly to receive the barrel-shaped portion 5 of the body 3. In view of such configuration, the barrel-shaped portions 5 and 8 will be hereinafter referred to as the inner barrel 5 and the outer barrel 8, respectively. When the former fits in the latter, the upper end portion of the latter fits in a tubular groove 9 formed at the root of the former.

With the metal fitting 4 secured to the pot 1 by means of rivets 10 (FIG. 1), the handle body 3 is rotatable from a position where the body 3 is shown by a solid line in FIG. 2 to a position where it is placed over a pot lid 11 as shown by a dot-and-dash line in FIG. 2. Means 12 (FIG. 3) for limiting the rotation of the body 3 include a shoulder 13 (FIGS. 4 and 5) formed in the tubular groove 9 to provide a seat for abutting one of two shoulders 14 (FIG. 3) formed on the upper end of the outer barrel 8.

Referring now to FIG. 4, the inside diameter of a recess 15 formed in the under surface of the hub-shaped portion 7 is substantially equal to the outside diameter of the outer barrel 8. The inner barrel 5 has such a length that when it is inserted into the outer barrel 8, the lower end of the inner barrel 5 partially projects into the recess 15. The recess has an indentation 19 located at the side away from the flange face 27 of the metal fitting 4.

With the inner barrel 5 inserted into the outer barrel 8, an arbor 16 is inserted in the hole 6 of the inner barrel 5 upwardly from the bottom. On the lower end of the arbor 16, two projections 17 are formed at diametrically opposite positions. One of these two projections 17 is in engagement with a notch 18 cut out in the lower end of the inner barrel 5, while the other comes into engagement with the indentation 19 when the body 3 is rotated until the shoulder 13 abuts one of the two shoulders 14 to place the body 3 normal to the flange face 27 of the metal fitting 4. The horizontal edge in the depth of the notch 18 is on a level with that in the depth of the indentation 19. The arbor 16 has such a length that when the top of the projections 17 abut against these horizontal edges, the upper end of the arbor 16 projects from the top of the body 3. The projecting portion has such a length that when the arbor 16 is pushed down, one of the projections 17 is disengaged from the indentation 19.

Both the projection 17 and the indentation 19 have a complementary trapezoidal section so as to facilitate the mutual engagement.

A blind hole 20 axially provided in the arbor 16 is open at its lower end and is closed at its upper end. A coil spring 21 for upwardly urging the arbor 16 is accommodated in the blind hole 20. One end of the spring 21 is in abutment with the upper closed end of the blind hole 20, while the other end is seated in a base plate 22 secured to the lower end of the metal fitting 4 by means of screws 25 so as to cover the recess 15.

A ring 23 for preventing the inner barrel 5 from slipping out of the outer barrel 8 is put on an annular groove 24 provided in the lower portion of the inner barrel 5.

The handle 2 is mounted on the pot 1 by securing the metal fitting 4 to the side face of the pot 1. When the body 3 is rotated from the position shown by a dot-and-dash line to the position shown by a solid line in FIG. 2, it is prevented from further rotation because the shoulder 13 in the tubular groove 9 abuts one of the two shoulders 14 of the outer barrel 8 as shown in FIG. 5. The body 3 is locked in this position because one of the projections 17 comes in engagement with the indentation 19 in the recess 15 as shown in FIG. 6. In this condition, the upper end of the arbor 16 projects from the top face of the body 3 as shown in FIG. 4.

When the arbor 16 is pushed down, the projection 17 is disengaged from the indentation 19 and the inner barrel 5 becomes capable of rotation as shown in FIG. 8. Now the body 3 can be rotated from the position shown in FIG. 5 clockwise to the position shown in FIG. 7 where the body 3 is placed over the pot lid 11.

According to another embodiment of the present invention shown in FIG. 9, a pot 1a is adapted to be held with both hands. Handles 2a according to this embodiment do not differ from the above-described handle 2 in the shape of the handle body.

The handle according to the present invention is applicable to a frying pan or the like.

From the foregoing, it will be recognized that the present invention has the following advantages:

(1) The body 3 can be rotated to such a position as to be placed over the pot lid 11. Therefore, the present invention spares such trouble as in the case with conventional handles which have to be detached from pots prior to packaging and transportation and have to be assembled before use. After use, the outside measurement of the pot 1 can be minimized simply by turning the body 3 to over the pot lid 11. Consequently, less storage space on a shelf is enough to accommodate the pots.

(2) By the provision of two projections 17 adapted to cooperate with the notch 18 and the indentation 19, the body 3 can be locked in a position where it is perpendicular to a tangent line to the curved surface of the pot 1.

(3) In order to release the body 3 from the abovementioned locked condition, the upper projecting portion of the arbor 16 has only to be pushed down.

What we claim is:

1. A handle of a pot comprising a handle body and a metal fitting secured to the pot for mounting said handle body to said pot, said handle body having a barrel-shaped portion projecting downwardly from one end thereof, said metal fitting having a barrel-shaped portion projecting upwardly and adapted to receive therein said barrel-shaped portion of the handle body, an arbor mounted in said barrel-shaped portion of said handle body and having a pair of projections formed on the lower end thereof, said arbor being formed with a blind hole which is closed at its top and open at its bottom, a spring means mounted in said blind hole to urge said arbor upwardly, a base plate covering the lower end of said barrel-shaped portion of said metal fitting and the lower end of said blind hole to support one end of said spring means, the top end of said arbor projecting from the top face of said handle body with one of said projections engaged in a notch formed in the lower end of said barrel-shaped portion of said handle body and the other of said projections engaged in an indentation formed in said metal fitting at lower end thereof, said barrel-shaped portion of said handle body being received in said barrel-shaped portion of said metal fitting so that said handle body can be rotated to an inoperative position over the pot for a limited angle.

* * * * *